United States Patent [19]

Novkov

[11] 3,787,941
[45] Jan. 29, 1974

[54] LOCKING PIN MECHANISM FOR SECURING TOOL BITS TO TOOL HOLDERS

[75] Inventor: Raymond E. Novkov, Cuyahoga Falls, Ohio

[73] Assignee: The Warner & Swasey Company, Cleveland, Ohio

[22] Filed: July 17, 1972

[21] Appl. No.: 272,428

[52] U.S. Cl. .................................................. 29/96
[51] Int. Cl. ............................................ B26d 1/00
[58] Field of Search ................................. 29/95, 96

[56] References Cited
UNITED STATES PATENTS

| | | | |
|---|---|---|---|
| 3,525,136 | 8/1970 | Crosby | 29/96 |
| 3,491,421 | 1/1970 | Holloway | 29/96 |
| 3,488,822 | 1/1970 | Jones | 29/96 |

FOREIGN PATENTS OR APPLICATIONS

| 1,105,065 | 9/1966 | Great Britain | 29/96 |

*Primary Examiner*—Leonidas Vlachos
*Attorney, Agent, or Firm*—Freeman and Taylor

[57] ABSTRACT

An improved locking arrangement for securing cutting tool bits to tool holders is provided by the use of a locking pin that is shiftably carried by the tool holder and has a projecting head portion that is received within the tool bit so that camming action on the pin shifts the tool bit between clamped and unclamped positions with respect to the tool holder. One unique feature of the improved locking mechanism is the use of an elongated flange on the pin that is received within a complementary shaped slot provided in the tool body, with this arrangement permitting a controlled tilting of the pin by the camming means to more efficiently draw the clamping bit into seated engagement with the tool holder. A second feature is the contouring of the tilting pin in such a manner that the same remains secured with regard to the tool holder even though it is in its loosened condition with the result that dropping or accidental displacement of the tilting pin is avoided during periods of tool bit changing or indexing.

7 Claims, 10 Drawing Figures

3,787,941

LOCKING PIN MECHANISM FOR SECURING TOOL BITS TO TOOL HOLDERS

BACKGROUND OF THE INVENTION

In metal cutting operations it is conventional practice to provide a tool holder that receives an expendable tool bit, with various devices and arrangements being employed in this regard dependent to some extent upon the particular machining operation that is involved. This invention relates to an improved mechanism for securing tool bits in place on the tool holder.

DESCRIPTION OF THE PRIOR ART

Applicant is aware of the following prior art U.S. Pat. Nos.: Hertel, 3,137,059; Milewski, 3,316,616; Milewski, 3,357,080; Viellet, 3,393,435; Reeve et al., 3,469,296; Jones, 3,488,822; Holloway, 3,491,421; Faber, 3,618,188.

All of the above references generally disclose means for moving a pin relatively of a tool body to effectuate a quick release type of clamping arrangement with the tool bit that is associated therewith.

The methods and approach taken by the above patents involve various ways for accomplishing the tilting movement just noted, but all are submitted to be relatively complex and expensive as compared to the present invention, and further none of the above-disclosed references teaches a controlled type of movement that insures maximum efficiency of clamping arrangement and bit location.

BRIEF SUMMARY OF THE INVENTION

In all instances of metal cutting, there are at least three major objectives that are sought in each instance.

First, the tool bit must be secured rigidly with respect to the tool holder in order to achieve the maximum degree of tool efficiency.

Second, the amount of time required to effectuate a change of tool bits, for example, must be held to a minimum because any such time that is required for a change is, in effect, lost time as far as tool operation is concerned.

Third, accurate location of a new tool bit with a minimum amount of operator assistance is required to avoid adjustment of the position of the tool holder.

The locking principle herein utilized wherein the expendable and/or indexible cutting element is quickly detached and/or indexed is applicable to all types of tool holders and tool bits associated therewith and can be utilized in any metal cutting operation such as, but not limited to, facing, turning, grooving, and cutoff.

It has been discovered that the above-noted objectives can be achieved in an efficient and economical fashion by providing means for tilting the locking pin which engages the cutting bit in a controlled fashion.

It has been discovered that this control of the tilting movement of the pin can be achieved by utilization of an elongated flange on the pin, with the flange being received in a complementary shaped recess or slot in the tool itself. In this fashion the degree of tilt is controlled.

It has also been discovered that by contouring the lower or bottom end of the locking pin in a somewhat hourglass-shaped configuration and employing a camming member which has a tapered shoulder to engage the smallest diameter portion of the pin, the pin will be retained within the tool during changing of the cutting bit.

This particular relative configuration between the pin and the camming element prevents disengagement between the pin and the tool holder unless the camming element is entirely removed from the combination.

It has been discovered that utilization of a pin and camming element of this type facilitates changing the tool while minimizing the difficulties of dropping the pin out of the tool holder.

Production of a locking mechanism having the above advantages accordingly becomes the principal object of this invention, with other objects thereof becoming more apparent upon a reading of the following brief specification, considered and interpreted in view of the accompanying drawings.

OF THE DRAWINGS

Figure 2:
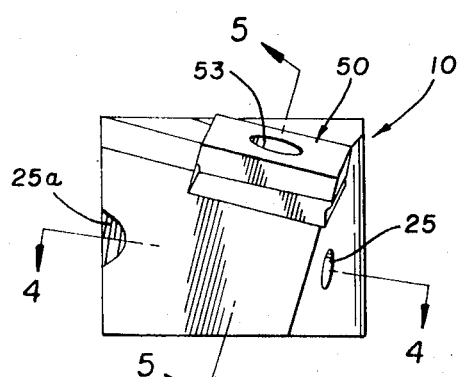
FIG. 2 is a front view of the assembled tool.
Figure 3:
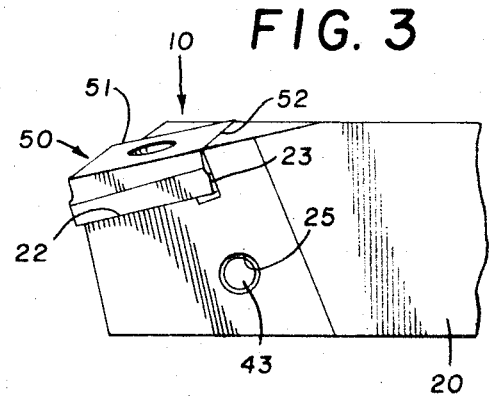
FIG. 3 is a partial side elevation showing the forward portion of the tool.
Figure 4:
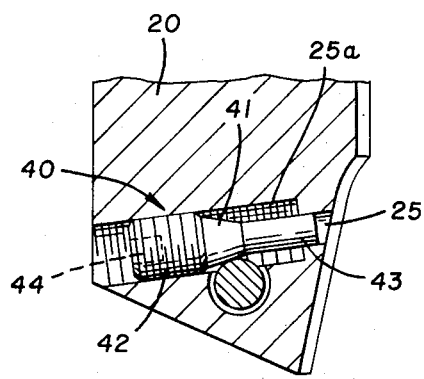
Figure 5:
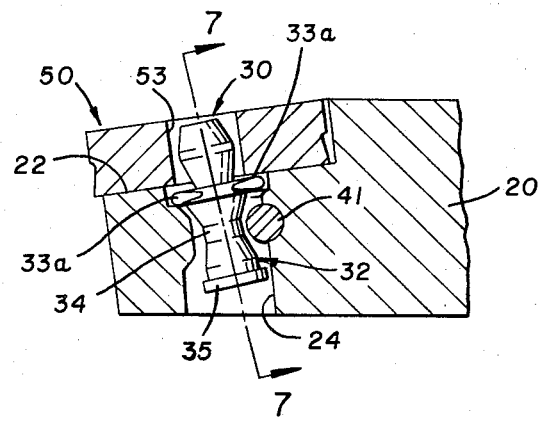

FIGS. 4 and 5 are sectional views taken on the lines 4—4 and 5—5 of FIG. 2.

Figure 6:
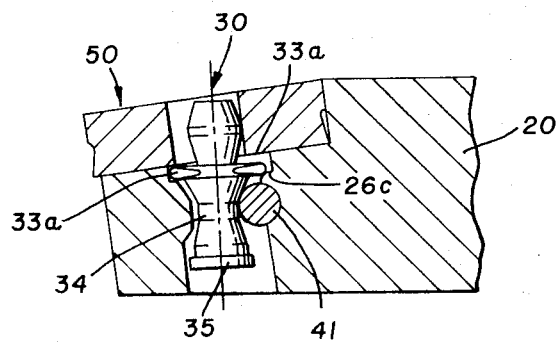

FIG. 6 is a view similar to FIG. 5 but showing the tool with the mechanism in locked or fully clamped position.

Figure 7:
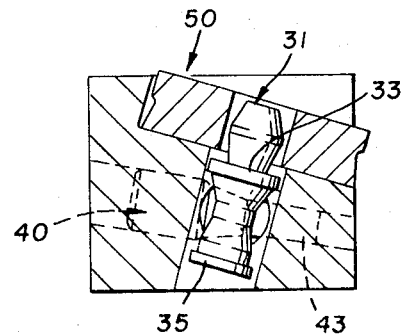

FIG. 7 is a sectional view taken on the lines 7—7 of FIG. 5.

Figure 8:
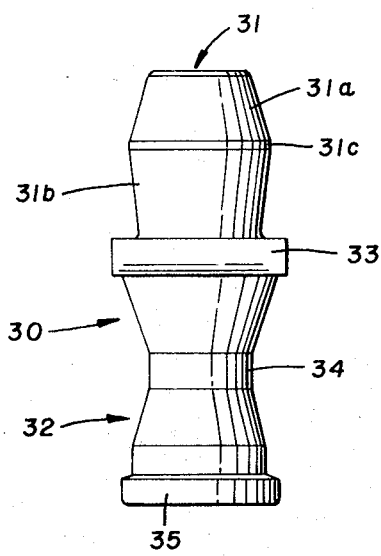

FIG. 8 is an elevational view of the locking pin shown in enlarged scale.

Figure 9:
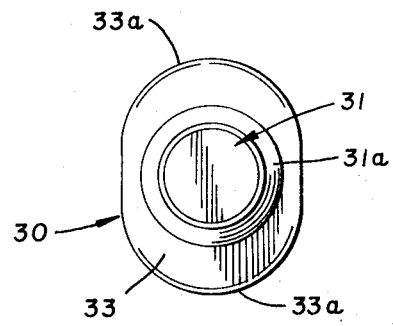

FIG. 9 is a top plan view of the locking pin.

Figure 10:
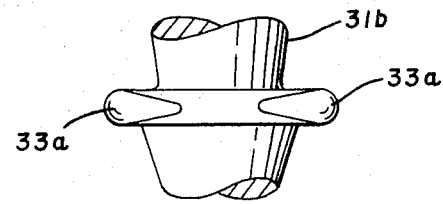

FIG. 10 is a side elevation of the locking pin.

DESCRIPTION OF THE PREFERRED EMBODIMENT

Figure 1:
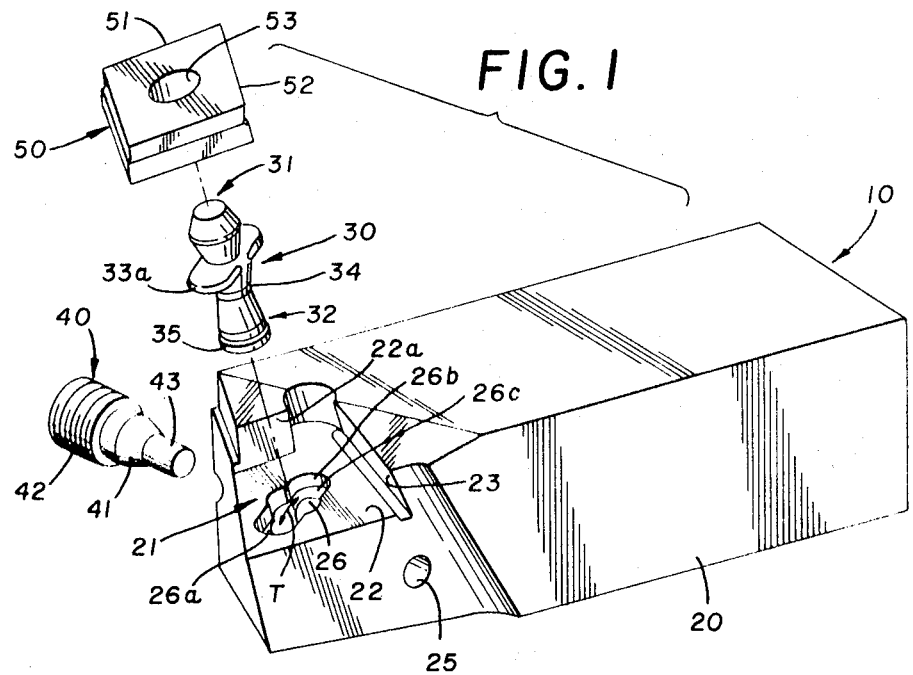
FIG. 1 is an exploded perspective view of the improved tool holder, locking mechanism, and tool bit shown associated to form a bar turning tool.

Referring now to the drawings and in particular to FIG. 1 thereof, the improved tool 10 that is illustrated includes a tool holder 20, a locking pin 30, a camming element 40, and a tool bit 50, with the arrangement being such that the pin 30 is received within an appropriate bore of the tool holder, as will be described, so as to have a projecting portion therein receivable within the opening of the tool bit 50, with camming element 40 serving tilt pin 30 in order to clamp the tool bit 50 onto the tool pocket 21 that is provided in the forward edge of the tool holder 20.

Considering the tool holder 20 in greater detail and referring to FIG. 1 of the drawings, it will be noted that the tool pocket 21 includes a support face 22 together with a pair of clamping faces 22a, 23, with this arrangement being intended to permit one face of the tool bit 50 being seated on the face 22 following which a pair of appropriate side edges, for example 51 and 52, can be drawn into engagement with the clamping faces 22a, 23, respectively, as is clearly shown in the drawings.

Referring now to FIGS. 1, 5, 6, and 7, it will be noted that the support face 22 of pocket 21 is provided with a downwardly extending bore 24 that is generally circular in nature and which is intersected by a cross bore 25 within which the cam member is received, with the bore 25 being counter-bored and tapped as at 25a to receive the camming element 40 therein, as clearly shown in FIGS. 4 and 5 of the drawings.

Referring again to FIG. 1, it will be noted that an elongated recessed slot 26 is provided in the face 22 of tool pocket 21 and has opposed ends 26a and 26b in opposed relationship on opposite sides of the bore 24. The bottom 26c of ends 26a and 26b of recessed slot 26 serves to provide a support shelf for certain components of the locking pin 30, as will presently be described.

Referring now to FIGS. 1, 8, 9, and 10, the locking pin 30 is generally cylindrical in nature with an upper portion 31 designed for reception within the opening 53 of tool bit 50 and a lower portion 32 that is designed to be received within the bore 24 of the tool holder 20. An elongate flange 33 is provided intermediate the upper and lower portions 31 and 32 for seating on the shelf formed by the bottom 26c of opposed ends 26a and 26b of the elongate recessed slot 26. It will be noted that the longitudinal extremeties of the flange 33 are preferably rounded as at 33a, 33a (FIG. 10) so that a tilting movement can occur as is clearly shown in FIGS. 5 and 6. Also, the opposed vertical sides of the flange are preferably flat, as shown best in FIG. 1, so as to be in sliding contact with the vertical walls of the recessed slot 26.

By this arrangement a controlled tilting movement by pin 30 in the direction of arrow T in FIG. 1 can occur so that the direction of clamping force can be applied selectively by the tool designer to achieve maximum efficiency.

The lower portion 32 of the pin 30 is generally of an hourglass configuration so as to have the reduced diameter portion 34 thereof acted upon by the inclined surface 41 of the camming element 40, as clearly shown in FIGS. 4, 5, and 6 of the drawings. The use of an hourglass configuration here minimizes the diameter of hole required for the bore 24 and permits the use of a smaller pin to thus cover a wider range of product applications. The lowermost portion of the pin 30 is slightly enlarged in diameter as at 35 for the purpose of restricting the amount of tilting by engagement with the walls of the bore 24 as shown in FIGS. 5 and 6 and to prevent accidental dislodgement of the pin.

With reference now to the upper portion 31 of the pin 30, the same has outwardly tapering wall surfaces 31a and 32b that merge into a contact wall 31c that will react against the walls of the bore 53 of bit 50 in a line type of application so as to permit tilting of the pin during the clamping operation.

With reference to the camming member 40, it has already been indicated that the same is provided with a tapered surface 41, and with reference to FIGS. 1 and 4, it will be further noted that threads 42 are provided for threaded coaction with the threads 25a of cross bore 25 so as to advance the camming member within the bore. It will be noted that the forwardmost end 43 of the camming member 40 is unthreaded and is received within the cross bore 25 as shown in FIG. 4. Finally, a slot or hexagonal opening 44 may be provided in the opposed end of the camming member 40 for reception of an appropriate wrench for turning purposes.

An important feature of the invention can be observed from FIG. 5 of the drawings wherein it will be noted that the tapered surface 41 of camming element 40 is in contact with the reduced diameter portion 34 of the pin 30. In this arrangement and as shown in the locked condition of FIG. 6 and as shown in the unlocked condition of FIG. 5, the tool bit 50 can be readily removed from the assembly, but it is impossible to remove the pin without first removing the camming element 40 in its entirety from within the confines of the cross bore 25. This prevents accidental disengagement of the pin during tool changing or indexing operations.

In use or operation of the improved tool holder, it will first be assumed that the component parts have been assembled to the condition shown in FIGS. 2 through 7 inclusive.

Starting with the tool in the unlocked position of FIG. 5, it is merely necessary for the operator to insert the appropriate tool within the slot or hex opening 44 of camming element 40 and cause the camming element to rotate about its axis within the bore 25. Such movement will advance the tapered surface 41 thereof into engagement with the lower hourglass portion 32 of the pin 30, and as a result of such progressive contact, the pin will tilt from the position of FIG. 5 to the position of FIG. 6, at which time the side edges 51 and 52 of tool bit 50 will have been respectively drawn into clamped engagement with the clamping faces 22a and 23 of the pocket 21 of the tool holder. Reversal of the direction of rotation of the camming element 40 will result in the tool bit 50 being unclamped, as in FIG. 5, so that removal or indexing thereof can be readily accomplished.

While a full and complete description of the invention has been set forth in accordance with the dictates of the Patent Statutes, it is to be understood that the invention is not intended to be limited to the specific form herein shown.

Accordingly, modifications of the invention may be set forth without departing from the spirit hereof or the scope of the appended claims.

What is claimed is:

1. A tool holder of the character described, comprising;
   A. a tool body having bit-receiving surfaces that include a support surface and a clamping surface;
   B. said support surface having a bore opening therein;
   C. an elongated pocket extending diagonally of said support surface in counter-bored relationship to said bore
      1. whereby opposed support shelves are provided;
   D. a locking pin having an upper portion and a lower portion interconnected by an elongated flange adapted to be received in said elongated pocket and seated on said shelf
      1. whereby said pin will be supported with respect to said bore by said flange;
   E. a tool bit having an opening therein designed to be received on the upper end portion of said locking pin when the same is received in said bore; and
   F. means for shifting said flange within the confines of said pocket whereby said tool bit may be moved into and out of clamped relationship with respect to said bit-receiving surfaces.

2. The device of claim 1 further characterized by the fact that said last mentioned means are received in said tool body and prevent removal of said locking pin when they are so received.

3. The device of claim 1 further characterized by the fact that said last mentioned means include
   A. a cross-bore in said body that intersects the bore opening into said support surface and B. a camming element shiftably received within said cross-bore for engagement with said lower portion of said locking pin.

4. A tool holder of the character described, comprising;
   A. a tool body having bit-receiving surfaces that include a support surface and a clamping surface;
   B. said support surface having a bore opening therein;
   C. an elongated pocket extending diagonally of said support surface in counter-bored relationship to said bore
      1. whereby opposed support shelves are provided;
   D. a locking pin having an upper portion and a lower portion interconnected by an elongated flange adapted to be received in said elongated pocket and seated on said shelf
      1. whereby said pin will be supported with respect to said bore by said flange;
   E. a tool bit having an opening therein designed to be received on the upper end portion of said locking pin when the same is received in said bore; and
   F. means for locking said pin against rotation about its longitudinal axis while simultaneously tilting the same along said longitudinal axis of said pocket whereby said bit may be shifted into and out of clamping relationship with said clamping element.

5. The device of claim 4 further characterized by the fact that said locking pin has a reduced diameter area on said lower portion between said flange and the bottom end of said pin.

6. The device of claim 5 further characterized by the fact that said last mentioned means include a camming element adapted to engage said reduced diameter area on said locking pin.

7. The device of claim 6 further characterized by the fact that said camming element has a sufficient length to protrude into said bore and prevent removal of said locking pin therefrom while said camming element is received in said tool holder.

* * * * *